(12) United States Patent
Hamzeh

(10) Patent No.: US 11,153,530 B2
(45) Date of Patent: *Oct. 19, 2021

(54) PARALLEL SCHEDULING OF MULTILAYERED MEDIA

(71) Applicant: Cable Television Laboratories, Inc., Louisville, CO (US)

(72) Inventor: Belal Hamzeh, Westminster, CO (US)

(73) Assignee: Cable Television Laboratories, Inc., Louisvlle (CO)

( * ) Notice: Subject to any disclaimer, the term of this patent is extended or adjusted under 35 U.S.C. 154(b) by 0 days.

This patent is subject to a terminal disclaimer.

(21) Appl. No.: 16/271,791

(22) Filed: Feb. 9, 2019

(65) Prior Publication Data

US 2019/0208162 A1 Jul. 4, 2019

Related U.S. Application Data

(63) Continuation of application No. 15/368,738, filed on Dec. 5, 2016, now Pat. No. 10,206,141, which is a
(Continued)

(51) Int. Cl.
*H04N 21/63* (2011.01)
*H04N 7/06* (2006.01)
(Continued)

(52) U.S. Cl.
CPC ......... *H04N 7/066* (2013.01); *H04L 12/4633* (2013.01); *H04L 45/24* (2013.01); *H04L 47/2433* (2013.01); *H04L 47/2483* (2013.01); *H04N 5/067* (2013.01); *H04N 21/236* (2013.01); *H04N 21/239* (2013.01); *H04N 21/23611* (2013.01); *H04N 21/234327* (2013.01); *H04N 21/262* (2013.01); *H04N 21/631* (2013.01); *H04N 21/6379* (2013.01); *H04N 21/64322* (2013.01); *H04N 21/8547* (2013.01); *H04W 4/18* (2013.01); *H04W 28/0215* (2013.01); *H04W 28/10* (2013.01);
(Continued)

(58) Field of Classification Search
CPC ............... H04N 21/631; H04N 21/236; H04N 21/23611
See application file for complete search history.

(56) References Cited

U.S. PATENT DOCUMENTS 5,481,312 A * 1/1996 Cash ................... H04L 12/6418
348/465
6,798,838 B1 * 9/2004 Ngo ...................... H04L 1/0003
375/240.19
(Continued)

FOREIGN PATENT DOCUMENTS

EP 0902590 A2 * 3/1999 ........... H04N 21/632

Primary Examiner — Robert J Hance
(74) Attorney, Agent, or Firm — Great Lakes Intellectual Property, PLLC

(57) ABSTRACT

Multi-link transportation of media, video and other data of the type having multiple layers, streams and/or encodings is contemplated. The multi-link transportation may be facilitated with a scheduler configured to schedule the various layers, streams, encodings, etc. for transportation over selectable communication links, such as based on reliability, capacity and/or other operating characteristics.

14 Claims, 2 Drawing Sheets

Related U.S. Application Data continuation of application No. 14/558,995, filed on Dec. 3, 2014, now Pat. No. 9,516,356.

(60) Provisional application No. 61/912,733, filed on Dec. 6, 2013.

(51) Int. Cl.

| | | |
|---|---|---|
| *H04N 21/236* | (2011.01) | |
| *H04N 21/239* | (2011.01) | |
| *H04N 21/2343* | (2011.01) | |
| *H04L 12/851* | (2013.01) | |
| *H04L 12/707* | (2013.01) | |
| *H04W 4/18* | (2009.01) | |
| *H04W 28/02* | (2009.01) | |
| *H04N 21/262* | (2011.01) | |
| *H04N 21/6379* | (2011.01) | |
| *H04N 21/643* | (2011.01) | |
| *H04N 21/8547* | (2011.01) | |
| *H04L 12/46* | (2006.01) | |
| *H04W 28/10* | (2009.01) | |
| *H04N 5/067* | (2006.01) | |
| *H04W 88/10* | (2009.01) | |
| *H04L 29/08* | (2006.01) | |
| *H04W 84/12* | (2009.01) | |

(52) U.S. Cl.
CPC ............. *H04L 67/02* (2013.01); *H04W 84/12* (2013.01); *H04W 88/10* (2013.01)

(56) References Cited

U.S. PATENT DOCUMENTS

| | | | | |
|---|---|---|---|---|
| 7,818,779 | B2 * | 10/2010 | Matsuzaki | H04N 21/4347 725/143 |
| 9,307,217 | B1 * | 4/2016 | Day | H04N 9/79 |
| 2004/0016000 | A1 * | 1/2004 | Zhang | H04N 21/234327 725/143 |
| 2005/0243835 | A1 * | 11/2005 | Sharma | H04L 12/2874 370/395.42 |
| 2008/0141317 | A1 * | 6/2008 | Radloff | H04N 5/44582 725/87 |
| 2008/0158339 | A1 * | 7/2008 | Civanlar | H04N 7/152 348/14.09 |
| 2009/0074074 | A1 * | 3/2009 | Au | H04N 19/164 375/240.18 |
| 2010/0186048 | A1 * | 7/2010 | Waller | H04N 21/4263 725/59 |
| 2010/0260254 | A1 * | 10/2010 | Kimmich | H04N 21/631 375/240.01 |
| 2010/0287296 | A1 * | 11/2010 | Riggert | H04L 69/14 709/231 |
| 2011/0083156 | A1 * | 4/2011 | Martinez | H04N 21/631 725/118 |
| 2011/0164686 | A1 | 7/2011 | Lu | |
| 2013/0239150 | A1 * | 9/2013 | Chen | H04N 21/2665 725/62 |
| 2013/0268985 | A1 * | 10/2013 | Kim | H04N 21/631 725/109 |
| 2014/0002598 | A1 * | 1/2014 | Kim | H04N 21/816 348/43 |
| 2014/0082054 | A1 * | 3/2014 | Denoual | H04N 21/85406 709/203 |
| 2014/0201329 | A1 * | 7/2014 | Himayat | H04N 21/6131 709/219 |
| 2014/0313989 | A1 * | 10/2014 | Doken | H04L 65/605 370/329 |
| 2019/0208162 | A1 * | 7/2019 | Hamzeh | H04N 5/067 |

\* cited by examiner

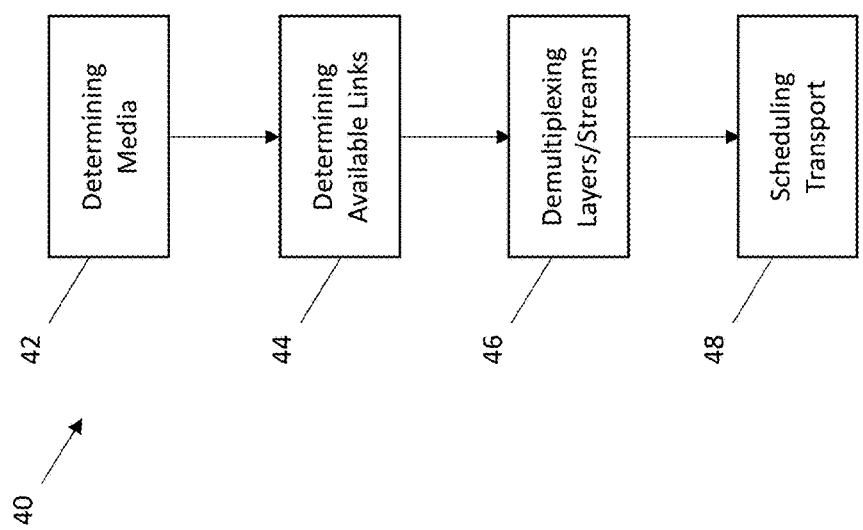

PARALLEL SCHEDULING OF MULTILAYERED MEDIA

CROSS-REFERENCE TO RELATED APPLICATIONS

This application is a continuation of U.S. application Ser. No. 15/368,738 filed Dec. 5, 2016, which in turn is a continuation of U.S. application Ser. No. 14/558,995 filed Dec. 3, 2014, which in turn claims the benefit of U.S. provisional application No. 61/912,733 filed Dec. 6, 2013, the disclosures and benefits of which are hereby incorporated in their entireties by reference herein.

TECHNICAL FIELD

The present invention relates to facilitating transportation of media, video and other data of the type having multiple layers, streams and/or encodings, such as but not necessarily limited to facilitating parallel transport scheduling of such multilayered media across multiple communication links.

BACKGROUND

Any number of techniques, protocols, specifications and the like exist to facilitate generating media in an electronically transmissible form. The electronically transmissible media may be generated by encoding, processing or otherwise manipulating an original content into an electronic form suitable for entirely or partially representing the original content. In the case of video, such as that formatted in accordance with Moving Picture Experts Group (MPEG) version 2 (MPEG-2) or version 4 (MPEG-4), the disclosures of which are hereby incorporated by reference in their entireties, the original content may be encoded into a plurality of layers/streams to generate the media, which may be referred to as multilayered media. MPEG encoders may be configured to produce multilayered media by encoding the original content into intra-coded pictures (I-frames), predicted pictures (P-frames) and bi-predictive pictures (B-frames). One non-limiting aspect of the present invention contemplates facilitating transport of multilayered media, video and other data of the type having multiple layers, streams and/or encodings.

BRIEF DESCRIPTION OF THE DRAWINGS

FIG. 2 illustrates a flowchart of a method for parallel scheduling of multilayered media in accordance with one non-limiting aspect of the present invention.

DETAILED DESCRIPTION

Figure 1:
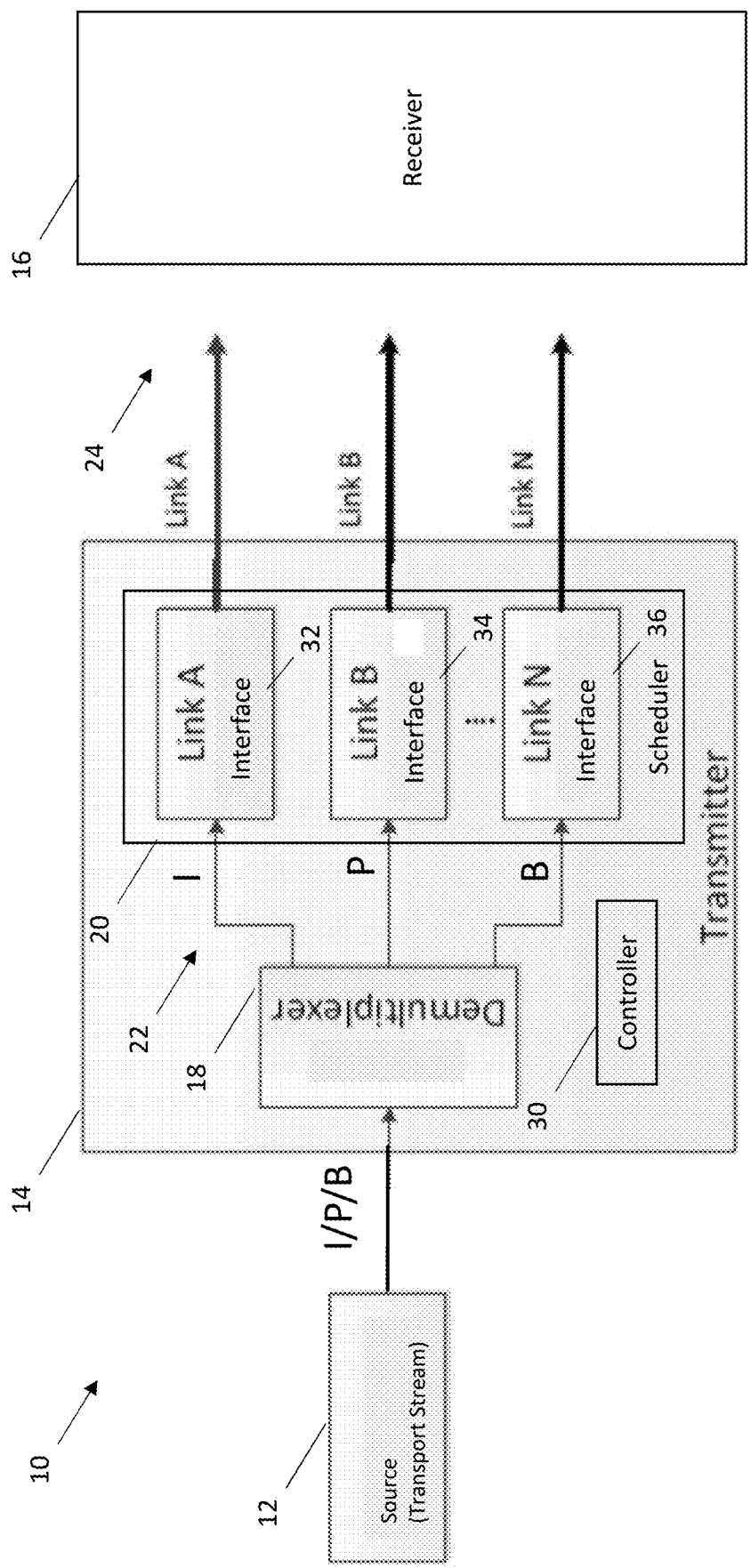
FIG. 1 illustrates a system for transporting multilayered media in accordance with one non-limiting aspect of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 illustrates a system 10 for transporting multilayered media in accordance with one non-limiting aspect of the present invention. The system 10 may be configured to facilitate transporting virtually any type of media, including video, audio, pictures, images, etc. and is for exemplary non-limiting purposes predominately described with respect to facilitating transport of video encoded according to MPEG and delivered within a transport stream from a source 12. The MPEG encoded video may include a plurality of layers to facilitate representing the original content as a plurality of video frames, optionally with a layer for each type of encoding, i.e. a layer for the I-frames, a layer for the P-frames and a layer for the B-frames. The I-frames may correspond with the fundamental frames for any image and come in at a lower rate (frequency), the P-frames may be generated at a higher rate than the I-frames and may be additive to the I-frames to add more resolution and similarly the B-frames may be generated at a higher rate than the P-frames to add more resolution A transmitter 14 may be configured in accordance with the present invention to process the transport stream, or more particularly one or more of the layers therein, for multi-link transport to a receiver 16.

The transmitter 14 may include a demultiplexor 18 to demultiplex or otherwise recover one or more layers/streams included within the transport stream for output to a scheduler 20, which for exemplary purposes is shown to correspond with recovery of a plurality of feeds 22. The scheduler 16 may be configured to schedule the plurality of feeds 22 for transport over a corresponding one or more of a plurality of links 24. The transmitter 14 may include a controller 30 configured to facilitate controlling the demultiplexor 18 and the scheduler 20 and to otherwise facilitate the operations contemplated herein, such as in accordance with a plurality of non-transitory instructions included within a computer-readable medium associated with the transmitter 14. One non-limiting aspect of the present invention contemplates the controller 30 being operable to assess operating conditions or characteristics of the plurality of links 24 and to schedule transport of the feeds 22 (I-frames/layer, P-frames/layer, B-frames/layer) over the links 24 as a function thereof. The capability to selectively manage the links 24 used to subsequently transport the video may be beneficial in enabling a service provider or other entity operating the transmitter 14 to maximize capacity, reliability, throughput and/or quality of service (QoS).

The transport scheduling contemplated by one non-limiting aspect of the present invention may be performed in a parallel manner whereby different portions of the transport stream may be simultaneously transported over two or more of the links 24. The parallel processing may take many forms and is illustrated for non-limiting purposes to correspond with an exemplary scenario where the I-frames, P-frames and B-frames, or corresponding portion/layer/stream 22 of the transport stream, are respectively transported over a first link, a second link and a third link of the plurality of links 24. The links 24 are generically shown to correspond with any communication medium suitable for transporting the various layers/streams and may be physically and/or logically distinct and comprised of some combination of wireless and/or wireline communication mediums. The scheduler 20 may include a plurality of interfaces 32, 34, 36 operable to facilitate communications with a corresponding link, optionally having capabilities associated with a signal processor, end station, eNodeB, base station, cable modem, Wi-Fi radio or other device having capabilities sufficient to facilitate the contemplated multi-link communications, including those suitable to facilitating Multiple-Input Multiple-Output (MIMO) communications, such as that associated with U.S. patent application Ser. Nos. 14/181,640, 14/181,641, 14/181,643 and 14/181,645, the disclosures of which are hereby incorporated by reference in their entireties herein.

The transport of one or more layers 22 over one or more links 24 may require processing, addressing or other manipulations to be performed at the corresponding interface. The interfaces 32, 34, 36 may be configured to support device Time Division Multiple Access (TDMA), Orthogonal Frequency Division Multiplexing (OFDM), Orthogonal Frequency Division Multiple Access (OFDMA), Single Carrier Frequency Division Multiple Access (SC-FDMA), Data Over Cable Service Interface Specifications (DOCSIS) 3.x, Long Term Evolution (LTE), LTE-Advanced (LTE-A), Wi-Max, Wi-Fi, Digital Video Broadcasting-Terrestrial (DVB-T), Digital Video Broadcasting-Handheld (DVB-H), etc., the disclosures of which are hereby incorporated by reference in their entireties. The interfaces 32, 34, 36 may optionally be configured to support a particular type of medium, e.g. one of the interfaces may be an LTE interface and another one of interfaces may be a Wi-Fi interface or a DOCSIS interface. The controller 30 and/or the interfaces may be responsible for addressing messages and otherwise complying with transmission requirements of the particular network. One non-limiting aspect of the present invention contemplates packets used to transport the layers/frames to be addressed according to Internet Protocol (IP), optionally with all of the packets having the same source and destination addresses due to the packets emanating from the same transmitter 14 and being received at the same receiver 16 or device associated with the receiver 16.

FIG. 2 illustrates a flowchart 40 of a method for parallel scheduling of multilayered media in accordance with one non-limiting aspect of the present invention. Block 42 relates to determining multilayered media desired for transport, such as in response to a transmission request received from a network scheduler or user input sufficient for identifying the media desired for transport and a destination address/location. The multilayered media may comprise or consist of any type of media having multiple layers, streams, portions or other identifiable units susceptible or otherwise amenable to the multi-link transport contemplated herein, such as MPEG-2, MPEG-4, H.263+ and DCT based encoding schemes. The portions of the media amenable to multi-link transport are hereinafter referred to for exemplary non-limiting purposes as layers, which may be identified to a transmitter as a function of information included with the corresponding transport request. Some media desired for transport may include more layers than other types of media and/or some media may include layers that change over time, e.g., a layer at a beginning of a particular type of media may not be present at an ending of the media. While not intending to limit the scope and contemplation of the present invention, the media may be a television program, movie, etc. formatted according to MPEG whereby the contemplated layers may be demarcated according to I-frames, B-frames, and P-frames.

Block 44 relates to determining links available for media transport. The links may be determined at a physical level, e.g., one link for Wi-Fi, one link for LTE and one link for DOCSIS, and/or the links may be determined at a logical or virtual level, e.g., one physical connection may support multiple links through virtual networks, tunnels, etc. The available links may also be determined as a function of operating characteristics, such as capacity, throughput, wireless spectrum, subscription rights and other variables tending to cause availability to be transient. The capacity or available capacity of a particular link may vary over time such that at one point in time the link is noted as being available while at another point in time the link may be noted as unavailable if overloaded. Similar determinations may be based on throughput or other operating characteristics, e.g., a physically available link may be determined to be logically or functionally unavailable if the throughput is below desired operating levels or licensing spectrum is temporarily unavailable. Optionally, the expected operating conditions over an expected length of the transport (e.g. movie run-time) may be analyzed to ensure the link remains available throughout a period of time needed to complete transport. In the event a link should become unavailable during transport, one of the other links may be engaged to make up for the deficiency.

Block 46 relates to demultiplexing the media desired for transport. The demultiplexing may include separating the media into a plurality of feeds associated with the different layers, e.g., the exemplary MPEG formatted video may be demultiplex into an I-Frame feed, a P-frame feed and a B-frame feed. The number of feeds or the amount of demultiplexing may correspond with the number of links selected to be available for transport. The demultiplexing may be skipped or delayed until a new link becomes available in the event a single link is determined or the demultiplexing may include generating a feed having multiple layers within it if the number of layers is greater than the available number of links (the I-frames and P-frames may be communicated over the same link as a single feed). The demultiplexing need not be stagnant throughout the corresponding transport and may be varied to more or less feeds/links as link operating characteristics change. The demultiplexing may include adding addressing information, timestamps or other data necessary to facilitate multiplexing the feeds back together at the receiver in a manner sufficient to enable desired playback. The multiplexing may also add delay, stuffing/blank frames and other data sufficient to synchronize the sequence of frames arriving at the receiver to compensate for transmission delays or inconsistencies attendant to the various links.

Block 48 relates to scheduling transport of the multilayered media. The scheduling may correspond with controlling the interfaces associated with each of the links selected for transport to communicate packets, signals or other segments depending on the operating characteristics of the corresponding link. The transport may be scheduled such that a received sequence of the frames following transport to the receiver is approximately equal to a multiplexed sequence of the frames when received at the demultiplexor, e.g., the media when received at the receivers is ordered in approximately the same order as when received at the demultiplexor. Optionally, the scheduler may facilitate transport of the media according to a transport sequence having delay, blanks, etc. added to compensate for transmission inequalities or latencies of the links. The transport sequence may differ from the multiplexed sequence by an amount or order sufficient for enabling the media to arrive at the receiver at the received sequence. The transport scheduling may also include facilitating the use of common source and destination addresses and/or notifying the receiver of various transmission related parameters necessary to facilitate the desired receipt and playback of the media.

As supported above, one non-limiting aspect of the present invention addresses issue of maximizing network user capacity by optimizing the delivery of multimedia to the maximum number of users, which may be is achieved by coupling a scheduling algorithm with the multilayer encoding supported by encoders such as MPEG4 to deliver the various layers over different links. In multilayer encoding, the source (video or audio) is encoded into multiple layers/ streams and one aspect of the present invention takes advantage of the properties of the encoding layers (for example the I/P/B frames) to maximize capacity (number of users) of video delivery when the traffic in a network can be carried over two different technologies; for example: A hybrid of a wireless network and a HFC network, an HFC network running different versions of the DOCSIS specification (ex. D3.1 and D3.0, or D3.0 and D2.1, etc. . . . ) The network may be composed of two (or more) physical or logical networks as described above; the first network (Network A) has the highest reliability or most penetration to the largest number of users, and the second network (Network B) has either less reliability or penetration. This concept is not limited to two physical or logical networks and can be extended to any number of networks.

To maximize capacity (number of users) of the video delivery, the I-frames may be scheduled for transport over the most reliable path or technology with most user penetration (Network A), P frames can be delivered over network A or B or a combination of both based on available capacity, and the B-frames over Network B. One example may relate to a hybrid HFC/wireless network where the I-frames and P-frames may be delivered over the HFC network and the B-frames may be delivered over the wireless network based on capacity availability. In this situation, the HFC network traffic may be alleviated (from the B-frame loading) allowing other applications/data to use the path, the largest number of users will have the video delivered to them and the B-frames may be delivered opportunistically over the wireless network based on network loading such that video capacity is maximized (video delivered to largest number of users) and the HFC traffic may be alleviated allowing other applications to run. Another example may relate to a DOCSIS 3.1 and DOCSIS 3.0 networks where initial network deployments may have a more pervasive DOCSIS 3.0 deployment and a gradually growing of D3.1 deployments. In this scenario, the I-frames and P-frames can be delivered over D3.0 and B frames can be delivered over D3.1 according to available capacity. Similar to above, this may guarantee that the maximum number of users are receiving the required video content, and based on available capacity or user tier rates, the B-frames can be delivered to the possible users to provide more resolution and video fidelity.

One non-limiting aspect of the present invention maximizes network capacity and utilization among subscribers while guaranteeing multimedia content delivery to the maximum number of users and allowing other applications/traffic to use and share the network. This may become even more crucial when video over IP becomes more prevalent. While delivery of the multilayer encoded video/audio over the same network without differentiation is contemplated, this can create large network traffic and limit the ability of other applications to share the network. Timing work across multiple networks may be coordinated across corresponding schedulers/interfaces. The schedulers may be in the same transmitter and synchronization between them may be managed so that packets going on Link B do not arrive at destination beyond a certain timeframe compared to frames on link A, as doing so would cause them to be essentially useless and the scheduler is better off dropping the packets. The receiver may have knowledge that it is receiving packets from two different links, and thus possibly over two different IP addresses, and will be able to identify that the packets originate from the same source based on IP address/ Port number. Given that the source of the frames are the same source (video source), there is no actual need to have multiple IP addresses given that they are originating from the same transmitter, IP address can be the same; as the goal of the IP address is to identify the source and the destination; but given that the links are different, the MAC addresses would be different. Several algorithms can be developed around the capabilities enabled with the present invention. The I-frame could be scheduled be on the network with most penetration or reliability or penetration x reliability to reach the largest number of users as it is a base frame. For the remainder of the frames, the scheduling can be based on latency, congestion, throughput, etc. and may depend on network operator needs and preferences.

One non-limiting aspect of the present invention contemplates an enhanced service delivery using Hybrid Wireless/ Coax links. The customers (end users), may evaluate their link using two basic metrics: 1. Bits per second (speed); and 2. Quality (Video quality for streaming, downtime, etc. . . . ) For a certain deployment, in order to improve the above two metrics without a change to the underlying physical network, the one aspect of the present invention contemplates an evolution of the technology being transported on the links (e.g. DOCSIS 2.0, DOCSIS 3.0, DOCSIS 3.1, etc. . . . ), which may in some circumstances be unable to address the one constraint associated with the underlying network infrastructure, e.g., the coax part of their network. Another aspect of the present invention contemplates augmenting the coax network with wireless links to create a Hybrid RF/Coax network where the wireless and coax networks intelligently cooperate in delivering the data to the users whereby data is delivered using wireless and coax, rather than wireless or coax. Given that the coax and the wireless channels can be considered to be orthogonal channels, this may provide huge flexibility in optimizing service delivery to the end user. Per Shannon's equations, adopting this solution may provide an aggregate capacity greater than the sum of the capacities of both systems running independently.

The contemplated cooperation between the wireless and coax can occur at multiple layers:
1. Physical layer: The wireless can possibly provide opportunistically high throughput links but with higher susceptibility to channel conditions which impacts performance, while the coax links provide a higher availability and reliability but with possibly lower rates. Cooperation between the wireless and the Coax link can occur in multiple ways: a. By jointly optimizing the modulation and coding across both channels; and b. Interference/Noise management on the link by load shifting and thus improving SNR, the throughput/QoS can be enhanced to the end user.
2. MAC layer: Intelligent multi-link Scheduling, to decide on which link to schedule certain flows based on the QoS requirements and link loading.
3. Cross layer MAC-PHY optimization: as given in scenario 1; load balancing across both channels can yield improved signal quality across the channels by reducing the overall noise, or scheduling decisions based on PHY channel conditions and availability.

One physical layer scenario may include a deployment of N users who are being supported by the hybrid network where a subset M require a high US throughput while the N-M have a low US throughput requirement. By shifting the M-N users to the wireless links, the present invention can reduce the noise on the US Coax link due to noise funneling, which effectively increases the US SNR for the M users without impacting the N-M user experience. One MAC layer scenario may include a deployment of N users who are being supported by the hybrid network where a subset M require average throughput but low latency SLA, while the remaining users are requiring a high bursty throughput without stringent requirements for latency SLA (ex. Browsing, FTP downloads, etc. . . . ). The MAC can then decide to schedule the M users on the wireless links, thus protecting them from queuing delays that can arise from the other high throughput users. One cross-layer scenario may include video delivery over hybrid network using MPEG4 where a MAC scheduler can decide to schedule the I and P frames over the Coax link thus guaranteeing the delivery of the basic video frames, while deciding to schedule the B frames over the wireless link, which can provide the enhanced video quality if the link loading conditions allow.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for transporting data from a server to a client comprising:
   identifying the data to be encoded according to at least a first encoding and a second encoding;
   identifying at least a first link to be available for transporting the first encoding to the client and a second link to be available for transporting the second encoding to the client;
   determining first parameters for the first link and second parameters for the second link, the first and second parameters respectively representing streaming characteristics associated with transport of the first and second encodings over the corresponding first and second link
   determining the first and second parameters to represent inequalities and/or latencies associated with the first and second links;
   selecting an order for transmission of the first and second encodings from the server as a function of the first and second parameters; and
   adding stuffing to the first encoding when being transported from the server to facilitate arrival at the client in the order, the stuffing being sufficient for increasing a total amount of data necessary to facilitate transport of the first encoding.

2. The method of claim 1 further comprising:
   deriving from the first and second parameters a first throughput of the first link and a second throughput of the second link; and
   communicating information derived from the first and second parameters to the client to facilitate the client accessing the first and second encodings when transported over the first and second links.

3. The method of claim 1 further comprising:
   receiving a request from the client associated with accessing the data; and
   allocating capacity for network elements of the first and second links to facilitate meeting the request.

4. The method of claim 3 further comprising allocating the capacity by limiting an ability of applications to contemporaneously share with the client the network elements needed to support transport of the data to the client.

5. The method of claim 3 further comprising determining the capacity based on round trip time (RTT) specified in the request to complete transport of the first and second encodings.

6. The method of claim 2 further comprising:
   receiving the data at the server within a data stream, the data stream omitting the information;
   encoding the data stream at the server according to a first type of encoding to generate the first encoding; and
   encoding the data stream at the server according to a second type of encoding to generate the second encoding, the second type differing from the first type.

7. The method of claim 1 further comprising:
   determining the data to be a video comprising a plurality of video frames;
   determining the first encoding to correspond with the plurality of video frames being encoded according to a first resolution; and
   determining the second encoding to correspond with the plurality of video frames being encoded according to a second resolution, the second resolution being different than the first resolution.

8. The method of claim 1 further comprising:
   determining the data to be a video comprising a plurality of video frames;
   determining the first encoding to correspond with the plurality of video frames being encoded according to a first bitrate; and
   determining the second encoding to correspond with the plurality of video frames being encoded according to a second bitrate, the second bitrate being different than the first bitrate.

9. A method for transporting data from a server to a client comprising:
   identifying the data to be encoded according to at least a first encoding and a second encoding;
   identifying at least a first link to be available for transporting the first encoding to the client and a second link to be available for transporting the second encoding to the client;
   determining first parameters for the first link and second parameters for the second link, the first and second parameters respectively representing streaming characteristics associated with transport of the first and second encodings over the corresponding first and second link;
   deriving from the first and second parameters a first throughput of the first link to be less than a second throughput of the second link;
   selecting an order for transmission of the first and second encodings from the server as a function of the first and second parameters; and
   adding synchronization data to the second encoding to compensate for the first throughput being less than the second throughput, including determining an amount and/or frequency of the synchronization data to be proportional to a difference between the first throughput and the second throughput such that the client renders the data without re-rendering and without missing portions of the data when switching from the first link to the second link during rendering.

10. The method of claim 9 further comprising adding the synchronization data as timestamps sufficient to facilitate relating in time a first sequence of first segments of the first encoding relative to a second sequence of second segments of the second encoding.

11. The method of claim 9 further comprising delaying transmission of one or both of the first and second encodings to compensate for inequalities or latencies between the first and second links.

12. A method for transporting data from a server to a client comprising:

identifying the data to be encoded according to at least a first encoding and a second encoding;

identifying at least a first link to be available for transporting the first encoding to the client and a second link to be available for transporting the second encoding to the client;

determining first parameters for the first link and second parameters for the second link, the first and second parameters respectively representing streaming characteristics associated with transport of the first and second encodings over the corresponding first and second link;

determining the first and second parameters to represent inequalities and/or latencies associated with the first and second links;

selecting an order for transmission of a plurality of packets comprising the first and second encodings, the plurality of packets being transmitted from the server as a function of the first and second parameters, the order relating in time the first encoding relative to the second encoding so as to arrive at the client in a manner matching a prior order that the first and second encodings were received at the server; and adding synchronization data to transmission of one or both of the first and second encodings such that the first and second encodings arrive at the client in the prior order, the synchronization data being independent of the plurality of packets.

13. A server for transporting media to a client, the server comprising:

an encoder device for separately encoding the media independently into at least a first encoding and a second encoding;

a first interface for transporting the first encoding over a first link and a second interface for transporting the second encoding over a second link, the second link being physically and/or logically distinct from the first link; and a controller having a plurality of non-transitory instructions executable with a processor associated therewith to facilitate transport of the media, the non-transitory instructions being sufficient for adding synchronization data to the first encoding, the synchronization data including stuffing and/or blanks to compensate for transmission inequalities or latencies between the first and second links.

14. The server of claim 13 wherein the non-transitory instructions of the controller are sufficient for determining one or more of capacity, throughput, wireless spectrum and subscription rights for each of the first and second links.

* * * * *